No. 608,538. Patented Aug. 2, 1898.
A. E. AYER.
LEATHER MEASURING MACHINE.
(Application filed Nov. 4, 1895.)
(No Model.) 3 Sheets—Sheet 1.
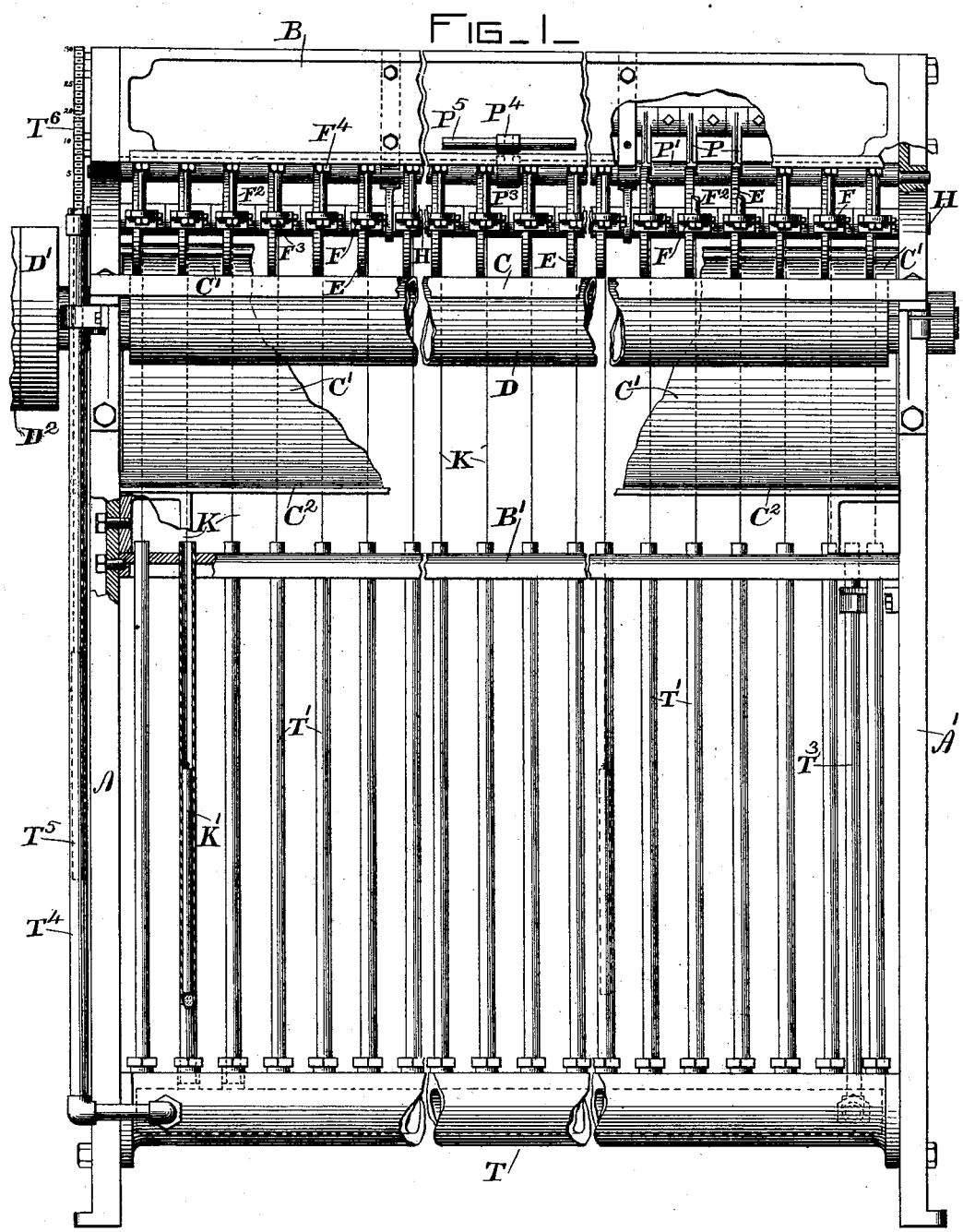
WITNESSES
INVENTOR
Albert E. Ayer,
by his Att'y,
Jos. P. Tolton.

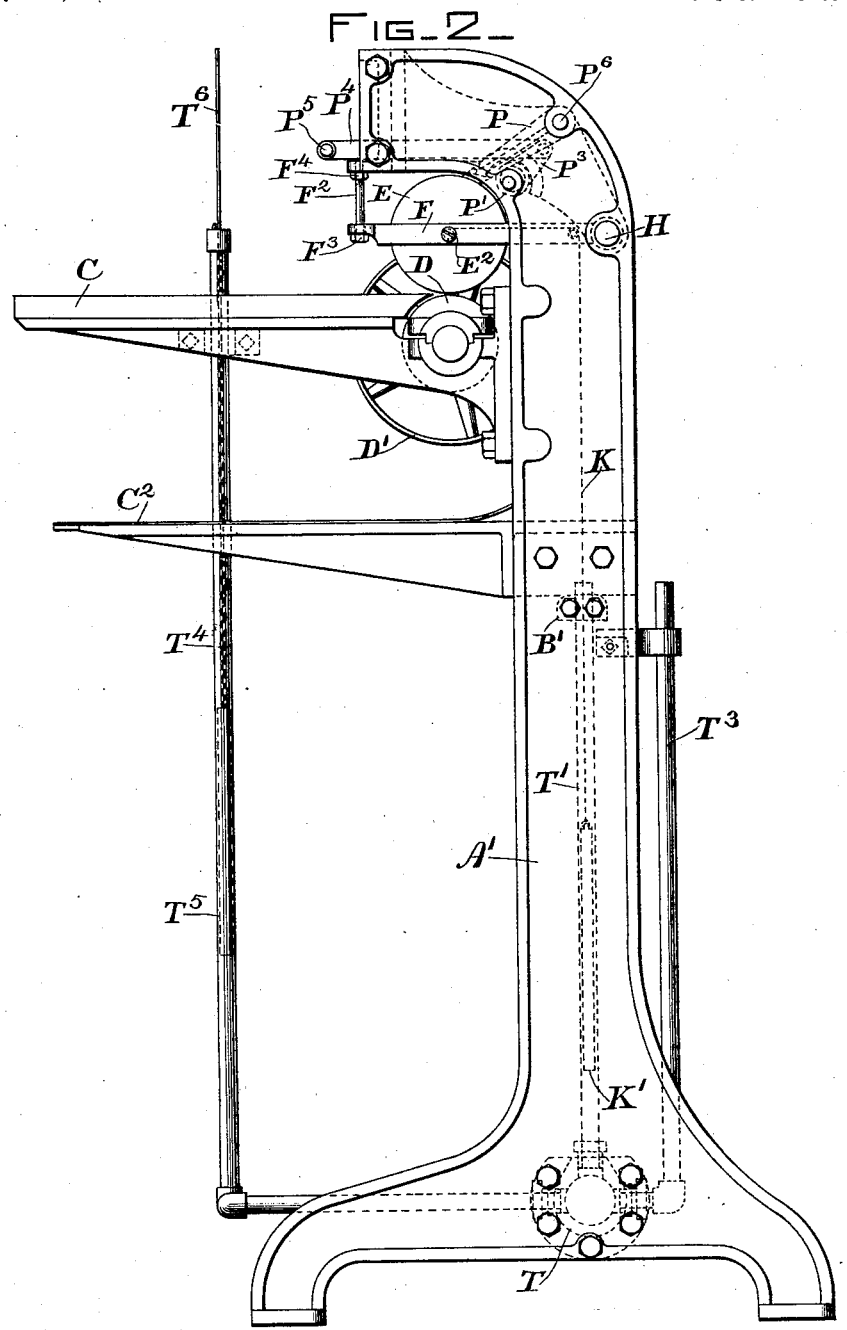

No. 608,538. Patented Aug. 2, 1898.
A. E. AYER.
LEATHER MEASURING MACHINE.
(Application filed Nov. 4, 1895.)
(No Model.) 3 Sheets—Sheet 3.
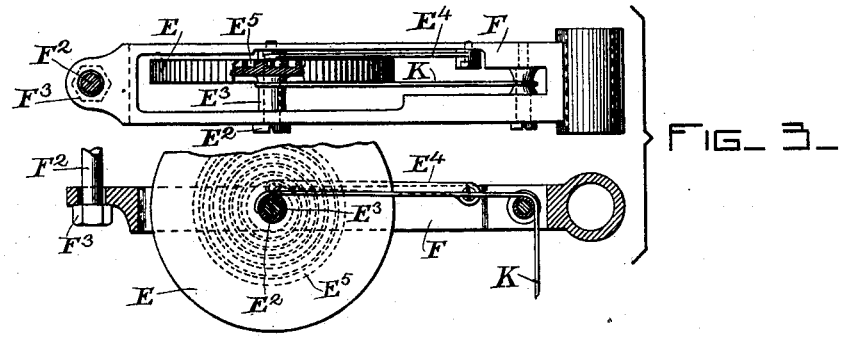
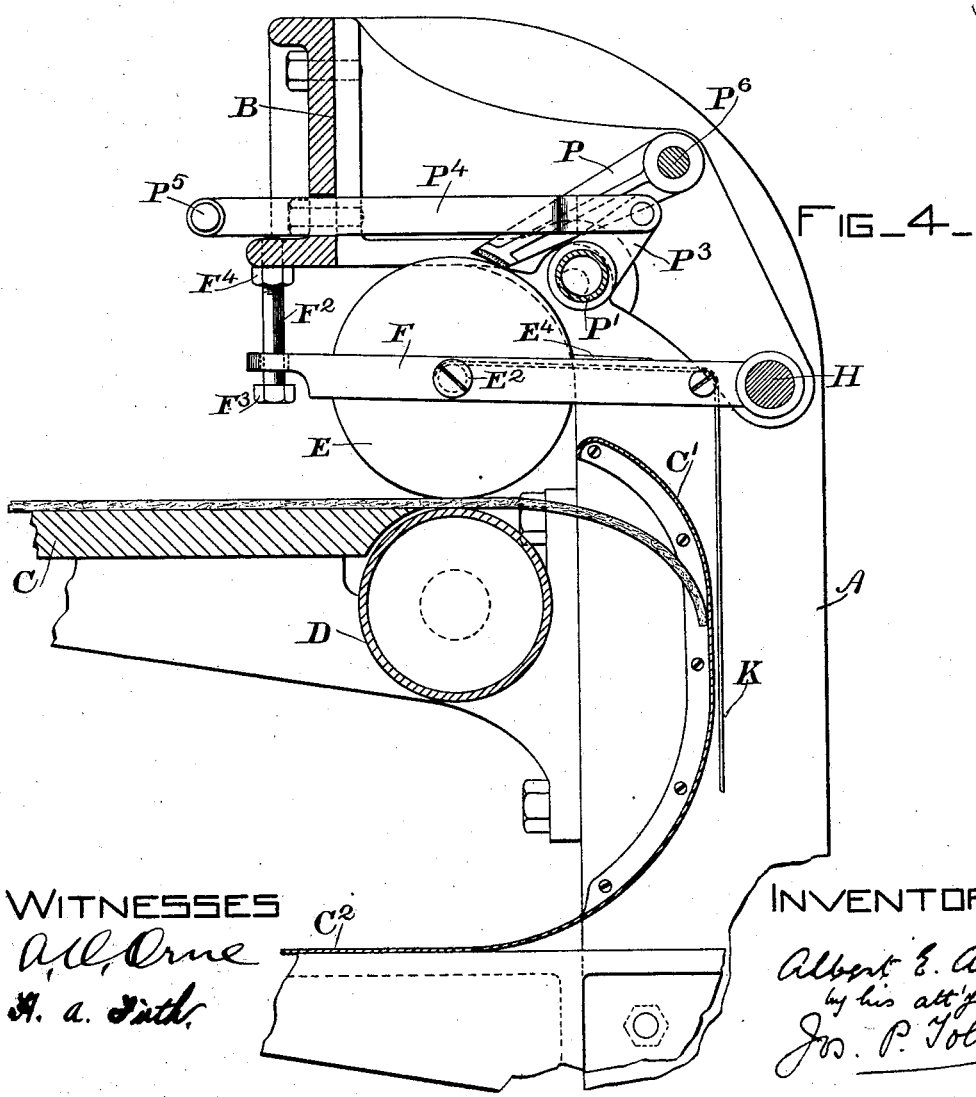

UNITED STATES PATENT OFFICE.

ALBERT E. AYER, OF BOSTON, MASSACHUSETTS, ASSIGNOR, BY MESNE ASSIGNMENTS, TO THE JUSTICE LEATHER MEASURING MACHINE COMPANY, OF MAINE.

LEATHER-MEASURING MACHINE.

SPECIFICATION forming part of Letters Patent No. 608,538, dated August 2, 1898.

Application filed November 4, 1895. Serial No. 568,156. (No model.) Patented in England July 29, 1895, No. 14,347.

*To all whom it may concern:*

Be it known that I, ALBERT E. AYER, of Boston, in the county of Suffolk and State of Massachusetts, have invented a new and useful Device for Measuring the Surface of Leather, (which has been patented in England, No. 14,347, dated July 29, 1895;) and I do hereby declare that the following is a full, clear, and exact description of the same, reference being had to the accompanying drawings and to the letters of reference marked thereon.

This machine is constructed to measure leather by simply passing the side of leather over a table and between a single lower feeding-cylinder and a series of independent upper measuring-wheels and adjusted to come in contact with the moving side of leather and to be made to rotate by it and to rotate only while in contact with the leather. The amount of rotation of each of the measuring-wheels determines the movement of a series of weights which are suspended in a corresponding series of upright tubes containing a liquid, all of the tubes being connected to a single closed tank, which has an upright branch in which the height of the liquid can be measured. The height of the liquid in the branch depends upon the position of the weights in the tubes, and as the positions of the weights are determined by the rotation of the measuring-wheels it is apparent that the height of the liquid in the branch of the tank will have a fixed relation to the area of the side of leather that has passed under the measuring-wheels. The mechanism by which I accomplish this is illustrated in the accompanying drawings, in which—

Figure 1 is a front elevation of the machine. Fig. 2 is a side elevation of the same. Figs. 3 and 4 are views in detail to illustrate the construction of parts.

The frame of the machine consists of two side pieces A and A', which are joined together at the top by the cross-piece B, at the middle by the cross-piece B', and near the bottom by the tank T, all of the parts being firmly bolted together by screw-bolts, as shown.

The feeding-cylinder D is mounted in the frame and has on its shaft fast and loose pulleys $D'$, $D^2$. The feeding-cylinder D should be sufficiently long to take the widest sides of leather. The upper side of the table C should be at or nearly level with the highest part of the feeding-cylinder, so that the side of leather to be measured may be easily fed into the machine.

Immediately above the feeding-cylinder D are placed a series of measuring-wheels E E. These measuring-wheels are free to rotate independently of each other. Each one is journaled in an adjustable arm F, (see Figs. 3 and 4,) said arms being pivoted at their rear ends to the rod H, their front ends being adjustably held by the screw-bolts $F^2$ $F^2$, each of the bolts $F^2$ $F^2$ being provided with a head $F^3$ and a check-nut $F^4$. (See Fig. 4.) Each of the measuring-wheels has a hub $E^3$, through which the spindle $E^2$ passes. A cord K is attached to each of the hubs of the measuring-wheels and has a weight K' hung to it, so that as the wheels are made to rotate the weights K' K' are drawn up. Levers $E^4$ being pivoted on the arms F and their outer ends resting in spiral grooves $E^5$ on the sides of the wheels E, as the leather passes through the machine the spiral grooves cause the levers $E^4$ to move toward the rims of the wheels, and when the pawls P release the wheels the backward motion ceases when the inner ends of the grooves $E^5$ reach the levers $E^4$.

Each of the measuring-wheels E E has a check-pawl P pivoted on the rod $P^6$, so that the said measuring-wheels cannot turn in the wrong direction. To free the measuring-wheels from the pawls, an eccentric-cylinder P' passes under them. This eccentric-cylinder can be operated by the handle $P^5$, which is connected by a link $P^4$ to an arm $P^3$, extending from said eccentric. By drawing the handle $P^5$ forward the eccentric P' is turned, which action will lift all of the pawls P P from the measuring-wheels and leave them free to be adjusted to the zero-point.

A sheet of metal C' is fastened to the sides A A' and extends across the machine in front of the cords K to protect them and guide the leather to the table $C^2$.

The series of weights K' K' are adapted to move freely in the series of upright tubes T' T'', which are partly filled with liquid. The weights K' displace a certain amount of the liquid, so that the position of the said weights will determine the height of liquid in the tubes, and as these tubes are all connected interiorly with the closed tank T, which in turn is connected to the branch T$^4$, it is evident that the position of the weights in the series of tubes will determine the height of the liquid in the tubes T' T'' and also in the branch tube T$^4$, it being understood that the weights K' K' are so made and arranged in relation to the tubes T' T'' and to the liquid within them that the said weights are never wholly immersed in the liquid.

Within the branch tube T$^4$ a float T$^5$ is placed. This float is provided with a graduated stem T$^6$, by the aid of which the exact level of the liquid may be determined.

T$^3$ is a tube connected with the tank T and is used for filling the same.

To use this measuring device, the wheels are set so as not to touch the feeding-cylinder D, but so near as to come in contact with the side of leather if any part of it comes between the cylinder and the wheel, and so long as there is any portion of the leather between the cylinder and any of the wheels then the said measuring-wheels will rotate. Before the side of leather is placed for measurement the wheels are so set that the weights K' K' will be sufficiently immersed to cause the liquid to stand at a level that will cause the graduated stem T$^6$ to indicate zero—that is, the liquid is at its highest point—and any movement of any of the measuring-wheels will lift the corresponding weights K' K' and cause the level of the liquid to fall. The amount of this falling of the liquid will be indicated on the stem T$^6$ and will be in exact proportion to the total movement of the measuring-wheels and to the consequent raising of the weights K' K'. When the entire side of leather has passed between the cylinder and the measuring-wheels, then all of the wheels will stop and the figures on the graduated stem T$^6$ will indicate the total area of the side of leather.

Having now particularly described and ascertained the nature of my said invention and in what manner the same is to be performed, I declare that what I claim is—

1. In an area-measuring machine a feeding-cylinder, a series of measuring-wheels adapted to operate as described, in combination with a series of weights, mechanically connected to the said measuring-wheels and moved by them, and partially immersed in a liquid and adapted by their movements to raise or lower the surface of the said liquid; and means for measuring the height of the said liquid substantially as and for the purpose set forth.

2. In an area-measuring machine the combination of a feeding-cylinder and a series of measuring-wheels as described; with a series of weights the movements of which are governed by the movements of the said measuring-wheels, said weights by their movements causing a change of level in a liquid, in which they are partially immersed, and a device for measuring the said change of level of the said liquid substantially as and for the purpose set forth.

3. In an area-measuring machine the combination of a feeding-cylinder D a series of measuring-wheels E E weights connected to said wheels and operated by them—tubes T' T'' tank T, branch tube T$^4$ float T$^5$ and graduated stem T$^6$ all adapted to operate together substantially as and for the purpose set forth.

In witness whereof I have signed this specification in the presence of two witnesses.

ALBERT E. AYER.

Witnesses:
E. H. CRANDELL,
EDWARD J. TUTTY.